(No Model.) 2 Sheets—Sheet 1.
W. C. TREADWELL.
ICE CREAM MOLD.
No. 486,362. Patented Nov. 15, 1892.
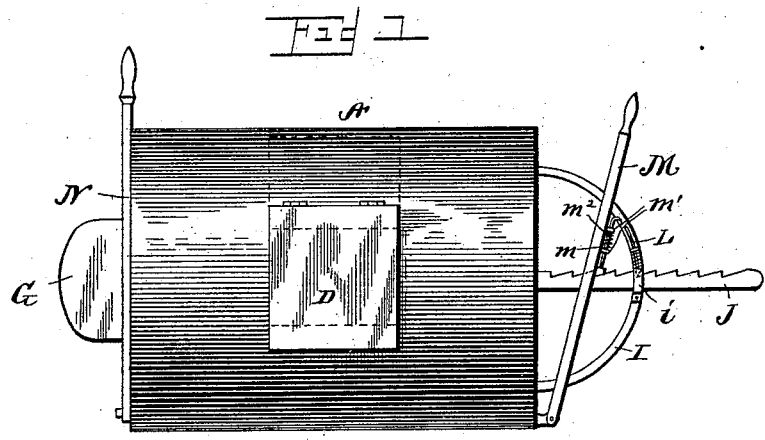
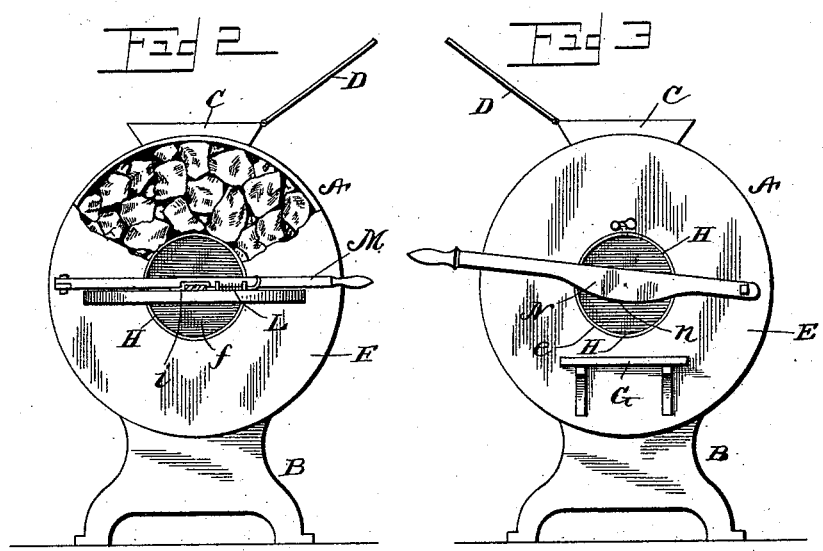
Witnesses
John Dunne
Bernard Merle
Inventor
Wellington C. Treadwell
By his Attorney
Franck D. Johns
THE NORRIS PETERS CO., PHOTO-LITHO., WASHINGTON, D. C.

(No Model.) 2 Sheets—Sheet 2.
W. C. TREADWELL.
ICE CREAM MOLD.
No. 486,362. Patented Nov. 15, 1892.
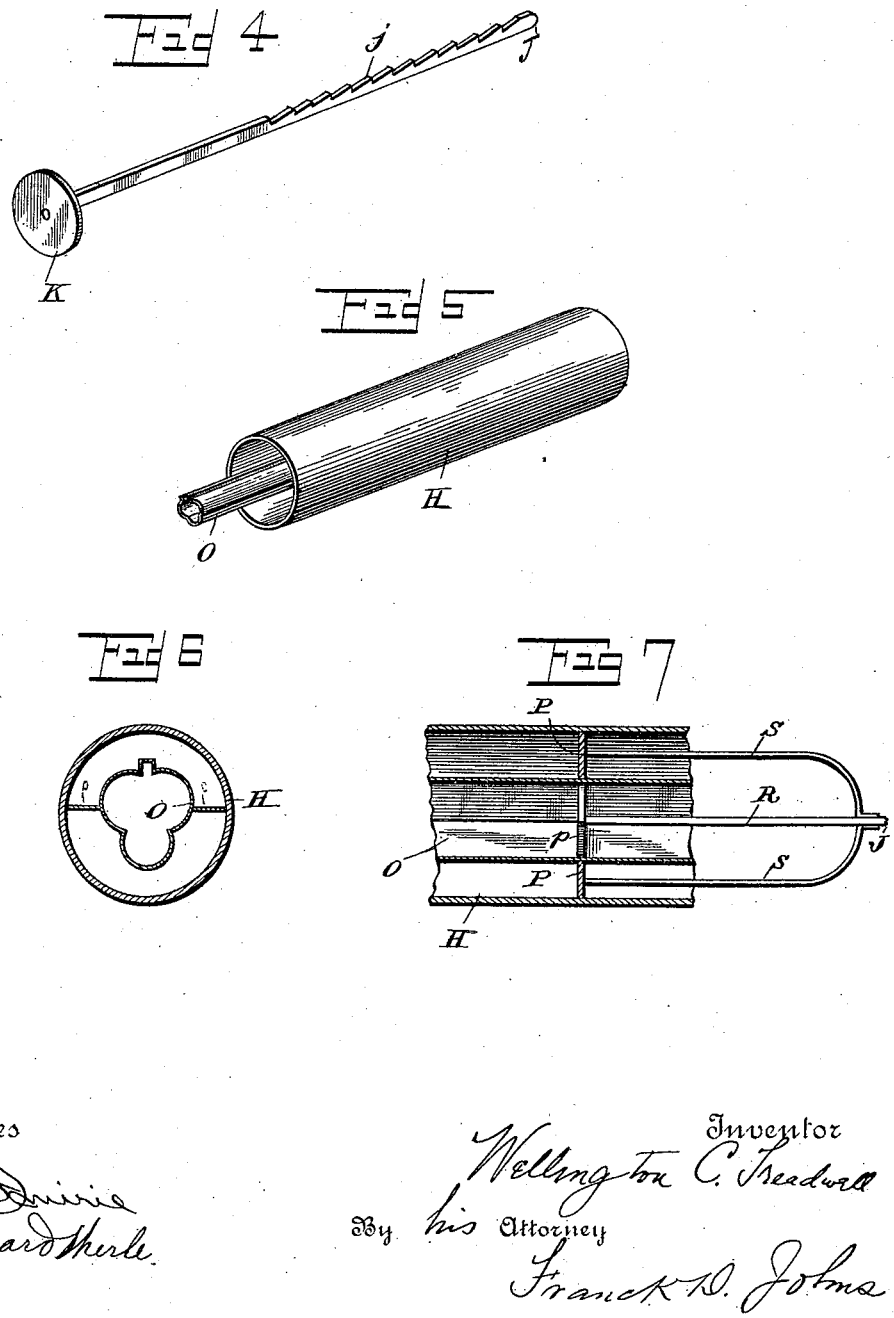

UNITED STATES PATENT OFFICE.

WELLINGTON C. TREADWELL, OF ADRIAN, MICHIGAN.

ICE-CREAM MOLD.

SPECIFICATION forming part of Letters Patent No. 486,362, dated November 15, 1892.

Application filed May 31, 1892. Serial No. 435,036. (No model.)

*To all whom it may concern:*

Be it known that I, WELLINGTON C. TREADWELL, a citizen of the United States, residing at Adrian, in the county of Lenawee and State of Michigan, have invented certain new and useful Improvements in Ice-Cream Molds; and I do hereby declare the following to be a full, clear, and exact description of the invention, such as will enable others skilled in the art to which it appertains to make and use the same.

My invention relates to certain new and useful improvements in ice-cream molds, and has for its object to produce a compact and portable device by means of which the ice-cream may be preserved in a solid condition and ejected from the mold in ornamental blocks or pieces of predetermined and uniform sizes; and to this end my invention consists in the novel construction and arrangement of parts hereinafter fully described, and afterward definitely pointed out in the claims, due reference being had to the accompanying drawings, forming a part of this specification, wherein—

Figure 1 is a top plan view of my improved device; Fig. 2, an end view partially broken away; Fig. 3, an end view looking from the opposite direction; Fig. 4, a perspective view of the plunger; Fig. 5, a view of the mold designed for producing ornamental-shaped blocks of cream; Fig. 6, a cross-section thereof; Fig. 7, a longitudinal section of a portion of the ornamental mold, showing its plunger in position therein.

Referring to the drawings, the letter A indicates the outer cylinder or casing, supported upon a suitable base B and provided with a hopper C and cover D. The cylinder A is closed at each end by heads E F, provided with central apertures $ef$ of the proper size to admit the mold, as hereinafter described. To the head E, below the aperture $e$, is secured, by brackets or other suitable means, a table G for supporting the saucer designed to receive the cream.

The mold H, which holds the cream, consists of a tube open at both ends and which may be of any shape in cross-section preferred, in the present case it being shown for the sake of convenience of illustration as cylindrical.

Before inserting the mold H within the casing A it is first packed with cream previously frozen in the ordinary manner. Ice is then introduced into the casing through the hopper C and packed around the mold. To the head F is secured a bracket I, which at its center is provided with a guide $i$, within which works the plunger-rod J. Said plunger-rod has secured to its inner end a piston or plunger K, which snugly fits the interior of the mold and is of a shape in cross-section to correspond with the shape of the mold. The plunger-rod J is provided with a series of ratchet-teeth $j$, equidistant apart, and a spring-actuated pawl L, secured in suitable bearings upon the bracket I, engages said ratchet-teeth and prevents any backward movement of the plunger-rod and plunger.

M indicates a lever pivoted at one end to the head F and provided with a pawl $m$, mounted in bearings $m'$ and actuated by a spiral spring $m^2$, so as to always engage the ratchet-teeth $j$ of the plunger-rod J. In dispensing the cream the lever M is drawn back until it engages the first of a series of ratchet-teeth $j$ and is then pushed forward until it strikes against the head F. The cream in the mold is thus ejected a distance corresponding to the distance between any two of the ratchet-teeth, the latter being so graduated that the exact amount of cream designed to be furnished a customer will be ejected from the mold H. A suitable receptacle being placed upon the table G, the cream is delivered thereon, as follows: To the head E is pivoted a knife N, provided about its center with a cutting-edge $n$, the knife abutting against the delivery end of the mold H. When the cream has been ejected from the mold H, the knife N is swung downward, cutting off the block of cream, which drops upon the receptacle placed upon the table G for its reception.

When it is desired to produce blocks of cream of contrasting colors or flavors, I employ a mold and plunger constructed in the manner shown in Figs. 6 and 7. For this purpose I employ a double mold consisting of an outer mold H and an inner mold O, the two being of different diameters. The mold O is centrally placed within the outer mold H and held therein by means of thin braces $o\ o$, soldered or otherwise suitably secured to both of said molds, and cream of one color or flavor is packed within the mold O and cream of a different flavor or contrasting color is placed within the mold H and about the mold O. To eject the cream from this double mold, I employ two plungers P p, which respectively fit the molds H O, and to the plunger p is secured a rod R and to the plunger P are secured two rods S S, said rods being united at their outer ends and secured to the plunger-rod J. A mold thus constructed will eject blocks of cream in which the center is of a different color or flavor from the outer portion of the same, and, if desired, the molds H and O may be of different shapes in cross-section, whereby blocks of cream can be dispensed having portions of contrasting colors and different shapes.

If desired, the end of the mold opposite the plunger may be provided with a cover similar in all respects to the cover commonly used for ice-cream freezers and too well known to need further description.

By means of my improved device the cream may be preserved for an indefinite period, and owing to its portability can be furnished to entertainments and the like and the cream dispensed in a most ornamental shape and in uniform quantities.

Having described my invention, what I claim is—

1. In an ice-cream mold, the combination, with a casing provided at opposite ends with apertured heads, of a mold open at both ends and supported in said apertured heads, a plunger fitting within said mold and provided with a rod having ratchet-teeth, a pivoted lever adapted to successively engage said ratchet-teeth, and a knife for cutting off the cream as it is ejected from the mold, substantially as described.

2. In an ice-cream mold, the combination, with the casing A, provided at opposite ends with apertured heads E F, of the mold H, open at both ends and supported in said apertured heads, a plunger K, fitting within said mold and provided with a rod J, having ratchet-teeth j, a bracket I, secured to the head F and carrying a spring-actuated pawl L, engaging said ratchet-teeth to prevent backward movement of the plunger, a pivoted lever M, carrying a spring-actuated pawl m, adapted to successively engage the ratchet-teeth, and a knife N for cutting off the cream as it is ejected from the mold, substantially as described.

In testimony whereof I affix my signature in presence of two witnesses.

WELLINGTON C. TREADWELL.

Witnesses:
R. B. ROBBINS,
IRA WATERMAN.